(12) United States Patent
Sinivaara

(10) Patent No.: US 10,069,895 B2
(45) Date of Patent: Sep. 4, 2018

(54) WIRELESS CONTENT LOADER FOR ENTERTAINMENT SYSTEM

(71) Applicant: PANASONIC AVIONICS CORPORATION, Lake Forest, CA (US)

(72) Inventor: Hasse Sinivaara, Mission Viejo, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 245 days.

(21) Appl. No.: 14/716,787

(22) Filed: May 19, 2015

(65) Prior Publication Data
US 2016/0344792 A1 Nov. 24, 2016

(51) Int. Cl.
*H04L 29/08* (2006.01)
*H04N 21/214* (2011.01)
(Continued)

(52) U.S. Cl.
CPC ........ *H04L 67/06* (2013.01); *B64D 11/00155* (2014.12); *H04B 7/0413* (2013.01);
(Continued)

(58) Field of Classification Search
CPC .............. H04L 67/06; H04N 21/23116; H04N 21/6131; H04N 21/43637; H04N 21/2146;
(Continued)

(56) References Cited

U.S. PATENT DOCUMENTS 5,383,140 A * 1/1995 Nanno .................. G06F 1/1616
200/43.01
7,949,335 B2 * 5/2011 Stefani .................. H04W 92/02
455/426.1
(Continued)

FOREIGN PATENT DOCUMENTS

CN 202918324 U 5/2013
WO 2013109189 7/2013

OTHER PUBLICATIONS

Extended European Search Report, Reference TG82778P.EPP, Application No. 16158333.1-1905, Sep. 21, 2016, 5 Pages.
Insys Aero, Aerospace Electronics & Systems, "Airborne Data Loader for IFE Content Uploads CDL100," http://www.insys-aero.com/aero/en/produkte/cdl100, Jun. 5, 2014.
(Continued)

*Primary Examiner* — John M MacIlwinen
(74) *Attorney, Agent, or Firm* — Stetina Brunda Garred & Brucker

(57) ABSTRACT

A battery-powered wireless content loader for an entertainment system of a vehicle includes a multi-mode wireless data communications module with at least a first communications mode and a second communications mode. A controller establishes a data link to a remote content server with the multi-mode wireless data communications module to retrieve multimedia content from the remote content server. The controller selects either one or both of the communications modes based at least in part upon an evaluation of availability of an access point for the first communications mode within range. A data storage device stores the retrieved multimedia content. An electrical power storage supplies power in response to the vehicle being powered down. The controller copies the multimedia content stored on the data storage device to a content server of the entertainment system following the electrical system of the vehicle being powered up.

20 Claims, 4 Drawing Sheets

(51) Int. Cl.

| | | |
|---|---|---|
| *H04N 21/231* | (2011.01) | |
| *H04N 21/258* | (2011.01) | |
| *H04N 21/262* | (2011.01) | |
| *H04N 21/414* | (2011.01) | |
| *H04N 21/418* | (2011.01) | |
| *H04N 21/426* | (2011.01) | |
| *H04N 21/432* | (2011.01) | |
| *H04N 21/4363* | (2011.01) | |
| *H04N 21/443* | (2011.01) | |
| *H04N 21/45* | (2011.01) | |
| *H04N 21/61* | (2011.01) | |
| *H04B 7/0413* | (2017.01) | |
| *H04W 4/04* | (2009.01) | |
| *B64D 11/00* | (2006.01) | |

(52) U.S. Cl.
CPC ... *H04N 21/2146* (2013.01); *H04N 21/23116* (2013.01); *H04N 21/25841* (2013.01); *H04N 21/26291* (2013.01); *H04N 21/4184* (2013.01); *H04N 21/41422* (2013.01); *H04N 21/42646* (2013.01); *H04N 21/432* (2013.01); *H04N 21/43637* (2013.01); *H04N 21/4436* (2013.01); *H04N 21/4524* (2013.01); *H04N 21/6131* (2013.01); *H04W 4/046* (2013.01)

(58) Field of Classification Search
CPC ......... H04N 21/26291; H04N 21/4184; H04N 21/432; H04N 21/4524; H04N 21/25841; H04B 7/0413; B64D 11/0015
See application file for complete search history.

(56) References Cited

U.S. PATENT DOCUMENTS

| | | | |
|---|---|---|---|
| 8,493,906 B1* | 7/2013 | Troxel | H04B 7/18506 370/316 |
| 8,949,908 B2 | 2/2015 | Ezaki et al. | |
| 2002/0199131 A1* | 12/2002 | Kocin | H02J 7/34 714/14 |
| 2003/0225641 A1* | 12/2003 | Gritzmacher | G06Q 30/04 705/34 |
| 2009/0102415 A1* | 4/2009 | Muchow | F03D 9/007 320/101 |
| 2010/0138879 A1* | 6/2010 | Bird | H04H 20/62 725/76 |
| 2010/0154008 A1 | 6/2010 | Hicks, III et al. | |
| 2010/0235891 A1 | 9/2010 | Oglesbee et al. | |
| 2012/0290529 A1* | 11/2012 | Baleedpalli | G06F 17/30345 707/609 |
| 2013/0237294 A1* | 9/2013 | Periyalwar | H04B 7/0689 455/575.7 |
| 2014/0120859 A1* | 5/2014 | Ekici | H04W 4/22 455/404.1 |
| 2014/0282747 A1 | 9/2014 | Richman et al. | |
| 2015/0008706 A1 | 1/2015 | Obadia et al. | |
| 2015/0150061 A1 | 5/2015 | Bleacher et al. | |
| 2015/0215899 A1 | 7/2015 | Kumar et al. | |
| 2016/0124052 A1* | 5/2016 | Inguva | G01R 31/3679 324/431 |

OTHER PUBLICATIONS

VT Miltope, "TWLU Terminal Wireless LAN Unit," http://mymiltope.com/airborne-systems/wireless/terminal-wireless-lan-unit/, Jun. 5, 2014.

* cited by examiner

WIRELESS CONTENT LOADER FOR ENTERTAINMENT SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to data communications devices for the field, and more particularly, to battery-powered wireless content loaders for vehicle entertainment systems.

2. Related Art

Air travel typically involves journeys over extended distances that at the very least take several hours to complete. Some of the longer non-stop international flights have scheduled durations of over sixteen hours with travelled distances extending beyond ten thousand miles. Passengers on board the aircraft are confined within an enclosed space of a designated seat for the entire duration of the flight, with only a few limited opportunities to leave the seat for use of the lavatory and so forth. Thus, even on the shortest trips an airline passenger has some idle time, which the passenger may occupy with work, leisure, and/or rest.

Many passengers bring their own personal electronic devices such as smart phones, media players, electronic readers, tablets, laptop computers, and so forth, for the express purpose of keeping occupied, but airlines also accommodate its customers with in-flight entertainment (IFE) systems. Although the specific installation may vary depending on the service class, each passenger seat is equipped with a display device, an audio output modality, an input modality such as a remote control, and a terminal unit. Generally, the terminal unit may generate video and audio signals, receive inputs from the remote control, and execute pre-programmed instructions in response thereto. The display device is typically an LCD screen that is installed on the seatback of the row in front of the passenger, though in some cases it may be mounted to a bulkhead or retractable arm or the like that is in turn mounted to the passenger's seat. Furthermore, the audio output modality is a headphone jack, to which a headphone, either supplied by the airline or by the passenger, may be connected.

Via the display and the audio outputs, a wide variety of multimedia content can be presented to the passenger. Recently released movies are a popular viewing choice, as are television shows such as news programs, situation and stand-up comedies, documentaries, and so on. Useful information about the destination such as airport disembarking procedures, immigration and custom procedures and the like is also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger using the remote control, which may also have alternative uses, namely, for navigating through the vast multimedia content library and making selections thereof for viewing and/or listening. Thus, the terminal unit may also include a content selection application with a graphical user interface, through which such navigation of the multimedia content library is possible. The foregoing types of programming that can be presented to the passenger via the in-flight entertainment system will henceforth be generally referred to as multimedia content.

The multimedia content is encoded and stored as digital data, with a video decoder and audio decoder of the terminal unit functioning to generate the aforementioned video and audio signals therefrom. It is desirable to have a wide range of different multimedia content to satisfy the varying tastes of passengers. It is also desirable to have a sufficient volume of multimedia content so that passengers can remain occupied with entertainment for the entire duration of the flight. Accordingly, the multimedia content stored onboard the aircraft can range in the hundreds of gigabytes, if not over a terabyte. The majority of the data comprises the video programming, although the audio and video game content may be significant as well. This data is typically not stored on each individual terminal unit, but rather, in a central content server also onboard the aircraft. In this regard, the terminal unit is understood to incorporate networking modalities such as Ethernet to establish data communications with the central content server. Once a particular selection of multimedia content is requested by the passenger via the content selection application, the terminal unit may retrieve the same from the central content server, decode the data, and present it to the passenger.

As important as variety and volume may be in regards to the multimedia content, novelty is as important for airlines to keep its passengers engaged with the in-flight entertainment system, particularly for valuable frequent fliers. Thus, the multimedia content stored on the content server must be frequently updated. Due to the large volume of data involved, a portable content loader that is generally comprised of a hard disk drive, an optical drive, or a solid state drive loaded with the update data is physically carried onboard while the aircraft is on the ground and connected to the central content server. A download process is then initiated, and once complete, the portable content loader is disconnected and removed from the aircraft.

In part because of the laborious manual procedures involved, the foregoing update process typically takes place on a monthly schedule during extend layovers between flights, such as when aircraft maintenance is conducted. However, it would be desirable for new multimedia content to be made available on a more frequent basis, incorporating programming that may be only days or even a few hours old. In response to this need, airborne data loaders that utilize wireless networking for multimedia content retrieval have been developed. Existing airborne data loaders are powered directly from the aircraft electrical system, and hence only operate while the aircraft is powered on. Other terminal devices have also utilized WiFi modalities to download content onto an aircraft, but these typically require the aircraft to be parked near the gate, where a WiFi access point is available. Additionally, satellite downlink-based loaders are also known in the art, but a separate, dedicated antenna(s) that typically utilize phased array technology must be installed on the aircraft exterior. There are additional power requirements for such satellite modalities as well.

Accordingly, there is a need in the art for an improved wireless content loader for in-flight entertainment systems.

BRIEF SUMMARY

The present disclosure contemplates a wireless content loader for an entertainment system of a vehicle. According to one embodiment, the content loader may include a multi-mode wireless data communications module having at least a first communications mode and a second communications mode. Additionally, there may be a controller that establishes a data link to a remote content server with the multi-mode wireless data communications module. Via this data link, multimedia content can be retrieved from the remote content server. The controller can select either one or both of the first communications mode and the second communications mode based at least in part upon an evaluation of availability of an access point for the first communications mode being within range of the system. The wireless content loader may also include a data storage device that can store the retrieved multimedia content. There may also be an electrical power storage device that can supply power to the multi-mode wireless data communications module, the controller, and the data storage device in response to an electrical system of the vehicle being powered down. The controller may copy the multimedia content stored on the data storage device to a content server of the entertainment system following the electrical system of the vehicle being powered up.

Another embodiment of the present disclosure contemplates a wireless multimedia content loader. The content loader may include a central processing unit, as well as a data storage device that is connected to the central processing unit. Furthermore, there may be one or more vehicle state sensor inputs lines that are also connected to the central processing unit. The content loader may include a vehicle network terminal controller that is connected to the central processing unit and in data transfer communications with an entertainment system content server to which multimedia content stored on the data storage device is copied. The content loader may further include a wireless communications subsystem that is connected to the central processing unit and establishes a data transfer link by which the multimedia content is downloaded from a remote content source server. There may additionally be a power management module regulating electrical power supplied to the central processing unit, the data storage device, the vehicle network terminal controller and the wireless communications subsystem. The central processing unit may command the power management module to source electrical power from an external rechargeable power source in response to a first predetermined signal from the one or more vehicle state sensor input lines.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure is directed to battery-powered wireless content loaders for vehicle entertainment systems, such as an in-flight entertainment for an aircraft. The detailed description set forth below in connection with the appended drawings is intended as a description of the presently preferred embodiments of the content loader, and is not intended to represent the only form in which it can be developed or utilized. The description sets forth the features of the content loader in connection with the illustrated embodiments. It is to be understood, however, that the same or equivalent functions may be accomplished by different embodiments that are also intended to be encompassed with the present disclosure. It is further understood that the use of relational terms such as first, second, and the like are used solely to distinguish one from another entity without necessarily requiring or implying any actual such order or relationship between such entities.

Figure 1:
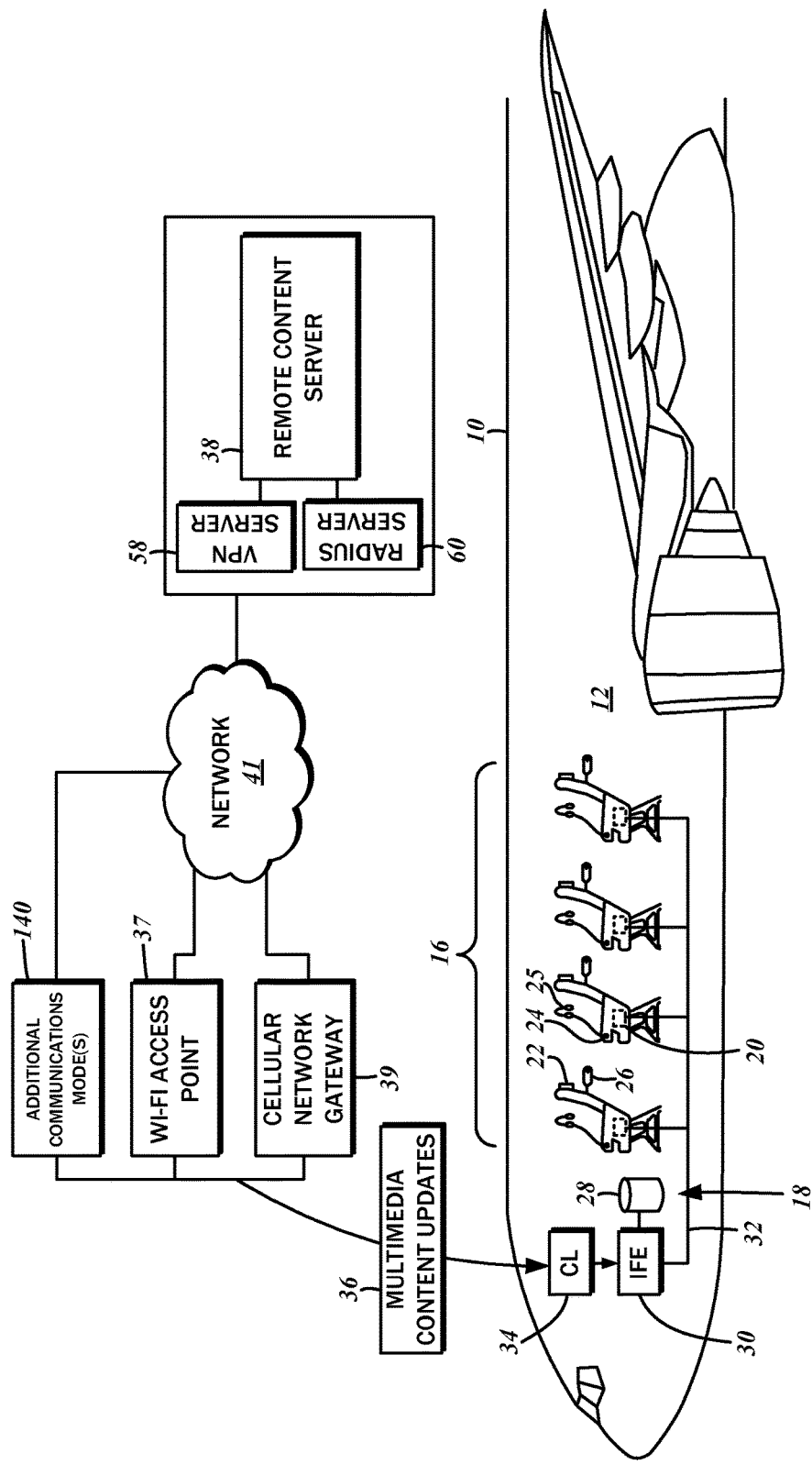
FIG. 1 is a diagram of an exemplary wireless content loader connected to and shown in the context of an aircraft in-flight entertainment system.

The diagram of FIG. 1 depicts an exemplary aircraft 10 in which various embodiments of the presently disclosed wireless content loader may be implemented. Within a fuselage 12 of the aircraft 10 there are seats 14 arranged over multiple rows 16, and each seat 14 accommodating a single passenger. Although the features of the present disclosure will be described in the context of passenger aircraft 10 and amenities therefor, other passenger vehicles such as trains, watercraft, buses, and others utilizing integrated entertainment systems may be substituted.

In a typical configuration, each passenger is provided with an in-flight entertainment (IFE) unit 18, which is generally comprised of a terminal unit 20, a display 22, an audio output 24, and a remote controller 26. For a given row 16 of seats 14, the terminal unit 20 and the audio output 24 are disposed on the seat 14 for which it is provided, but the display 22 and the remote controller 26 may be disposed on the row 16 in front of the seat 14 to which it is provided. That is, the display 22 and the remote controller 26 are installed on the seatback of the row in front of the seat. It will be appreciated that this is by way of example only, and other display 22 and remote controller 26 mounting and access configurations such as a retractable arm or the like mounted to an armrest of the seat 14 may be employed on a bulkhead.

The display 22 is understood to be a conventional liquid crystal display (LCD) screen with a low profile that is suitable for installation on the seatback. Each passenger can utilize an individual headset 25, supplied by either the airline or by the passenger, which provides a more private listening experience. In the illustrated embodiment, the audio output 24 is a headphone jack that is a standard ring/tip/sleeve socket. The headphone jack may be disposed in proximity to the display 22 or on the armrest of the seat 14 as shown. The headphone jack may be an active type with noise canceling and including three sockets or a standard audio output without noise canceling. In alternate embodiments, each display 22 may incorporate a terminal unit 20 to form a display unit referred to in the art as a smart monitor.

As discussed earlier, the terminal unit 20 may be implemented with a general purpose data processor that decodes the data files corresponding to the multimedia content and generate video and audio signals to the display 22 and the audio output 24, respectively. The multimedia content data files are stored in a repository 28 that is accessed by an in-flight entertainment system content server 30. The terminal units 20 for each seat 14 may be connected to the in-flight entertainment system content server 30 over a local area network 32, which may preferably be Ethernet. Thus, over the local area network 32, the terminal units 20 initiate a request for the multimedia content to the in-flight entertainment system content server 30, which responds to such request by retrieving the requested multimedia content from the repository 28 and streaming it to the requesting terminal unit 20. There are a variety of ways in which the functionality of the in-flight entertainment system content server 30 and the terminal units 20 may be implemented, and the foregoing is by way of example only.

Along these lines, the specifics of the multimedia content are not pertinent to the features of the wireless content loader 34, though it is generally comprised of recently released movies, television shows such as news programs, comedy, documentaries, and informational content pertinent to the flight destination. Furthermore, multimedia content may also encompass audio-only programming, as well as interactive games, flight progress mapping, flight status displays, newspapers/magazines readable on the display 22, and so on. Broadly, multimedia content is intended to refer to any content of varying duration and form that can be presented to the passenger via the display 22 or the audio output 24, or a combination thereof.

The passenger can play the aforementioned games and otherwise interact with the multimedia content with the remote controller 26. Navigating through the vast multimedia content library and selecting ones for viewing and/or listening is also possible with the remote controller 26, though in some embodiments, a touch-screen display may be provided for a more intuitive interaction with the multimedia content library. In either case, the terminal unit 20 is loaded with a content selection software application that is executed by the data processor and accepts input from the remote controller 26 or other input modality and generates a response on the graphical interface presented on the display 22.

In accordance with various embodiments of the present disclosure, a content loader 34 may be utilized to download multimedia content updates 36 for storage in the repository 28. In particular, such multimedia content updates 36 may be downloaded overnight while the aircraft 10 is powered off. In some cases, the aircraft 10 is parked at or near the gate terminal such that a nearby Wi-Fi access point 37 can be utilized to connect to a remote content server 38. Alternatively, when the aircraft 10 is parked away from the gate where no Wi-Fi access exists, a cellular network, via a cellular network gateway 39 can be utilized to connect to the remote content server 38. The Wi-Fi access point 37 and the cellular network gateway 39 may be connected to the remote content server 38 over the Internet or other network 41, e.g., an intranet or private network.

Figure 2:
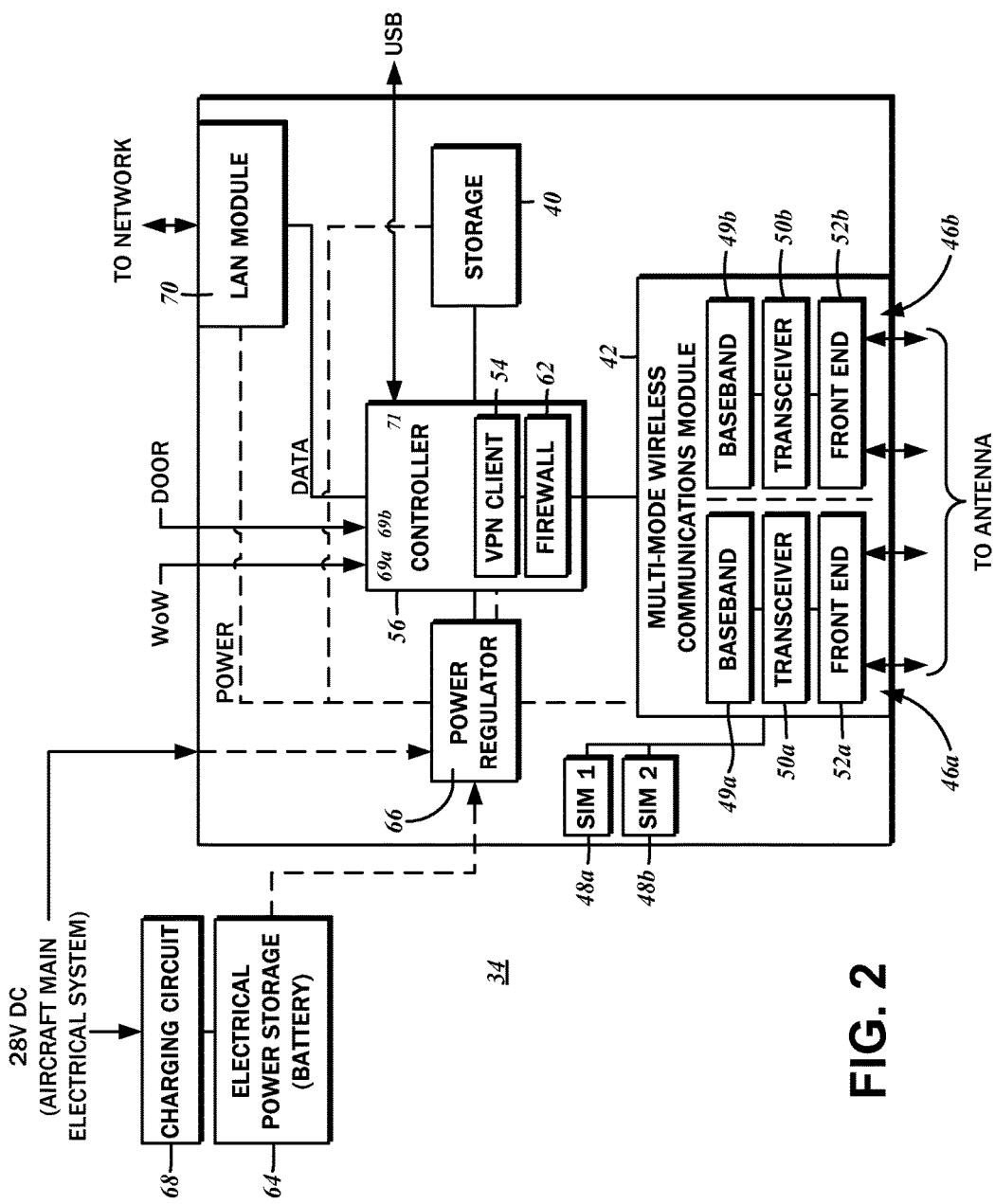
FIG. 2 is a detailed functional block diagram of one embodiment of the wireless content loader in accordance with the present disclosure.

Depicted in FIG. 2 is a functional block diagram of the content loader 34, which segregates the various functions thereof into different logical modules and shows the inputs and outputs to and from each such logical module. The division of these functions and grouping into generalized modules is presented by way of example only and not of limitation, and there are alternative embodiments described in further detail below in which different components perform different functions.

One embodiment of the content loader 34 includes a data storage device 40 on which the downloaded multimedia content updates 36 may be stored. Although the particulars may vary, the data storage device 40 may preferably, though optionally, be a solid state drive (SSD) of at least 512 GB, though a more minimal implementation may utilize a drive with 256 GB capacity.

The content loader 34 also includes a multi-mode wireless data communications module 42, which may have at least a first communications mode and a second communications mode. As briefly mentioned above, one of the communications modes can be a Wireless LAN modality that conforms to the Institute of Electrical and Electronics Engineers (IEEE) 802.11 standards, also known in the art as Wi-Fi. In order to implement this first communications mode, the multi-mode wireless data communications module 42 may incorporate a Wi-Fi network interface card (NIC) 44. In order to ensure compatibility with all possible Wi-Fi access points that may be encountered, the NIC 44 is understood to have both 2.4 GHz and 5 GHz modes, and implement all existing 802.11 standards, including a, g, n, and ac protocols. The Wi-Fi NIC 44 may be connected to one or more antennas, and preferably three so that 3×3 MIMO (Multiple-In, Multiple-Out) Operation is possible, the details of which will be provided below. The antennas may be incorporated into the line-replaceable unit of the content loader 34, or alternatively, may be externally mounted to the fuselage 12 of the aircraft 10, with signal transmission lines connecting such antennas to the line-replaceable unit. In different embodiments, the connector that links the antenna line to the ports of the content loader are based on a subminiature-A (SMA) coaxial RF connector that can be panel-mounted, flange-mounted, or a bulkhead type.

The second wireless communications mode, as mentioned above, is a cellular network modality. A wide variety of technologies and standards for cellular data communications are deployed around the world, and because the aircraft 10 is likely to be flown to numerous worldwide destinations, the multi-mode wireless data communications module 42 is configured for different cellular technologies/technology families. One such cellular technology is GSM/EDGE (Global System for Mobile Communications/Enhance Data Rates for GSM Evolution. The data service of EDGE is also referred to as GPRS (General Packet Radio Service), and is likewise implemented in the multi-mode wireless data communications module 42. The latest advancement is also referred to as 4G LTE (Long Term Evolution), and a layer-1 data rate up to 500 Mbit/s is envisioned. There are two existing transmission technologies with LTE—Frequency Division Duplex (FDD) and Time Division Duplex (TDD). Because different countries have varying frequency allocations, the multi-mode wireless data communications module 42 is configured for different FDD transmissions between the 700 MHz band and the 2600 MHz band, including the 700 MHz band, the 800 MHz band, the 900 MHz band, the 1800 MHz band, the 1900 MHz band, and the 2100 MHz band in particular. Earlier GSM-based systems such as UMTS (Universal Mobile Telecommunications System) with operating frequencies in the 850 MHz band, the 900 MHz band, the 1900 MHz band, and the 2100 MHz band are also supported. Furthermore, operation in the AWS band and the 800 MHz band are contemplated, though this is optional. An alternative cellular technology also implemented in the multi-mode wireless data communications module is W-CDMA (Wideband Code Division Multiple Access), the third generation (3G) data service component of which is known in the art as HSPA+ (Evolved High Speed Packet Access).

The second operating mode of the multi-mode wireless data communications module 42 may be implemented as a cellular system 46, also referred to as a cellular RF (Radio Frequency) module, which includes one or more baseband processors 49 for the multiple cellular technologies, corresponding transceivers 50, and front end modules 52 for the receive and transmit lines of each of the transceivers 50 connected to antennas. As RF circuit designs for cellular network communications are conventional and well-known in the art, the details thereof will be omitted. According to one embodiment, more than one cellular system 46 can be concurrently operating, and so there may be a 4G LTE cellular system 46*a* and a 3G cellular system 46*b*. Along these lines, the Wi-Fi NIC 44 can also be concurrently operating with one or all of the cellular systems 46. The operating mode and frequency band for each of the cellular systems 46 may each be set independently.

The antennas to which the input and output lines of the front end modules 52 are connected may be either integrated into the line replaceable unit of the content loader 34, or externally installed on the fuselage 12 of the aircraft 10. In one implementation, there may be two connections to two antennas (either internal or external mount) for 2×2 Multiple-In-Multiple-Out MIMO operation.

A Subscriber Identity Module (SIM) card 48 is utilized to identify the content loader 34 to available cellular networks with data encoded thereon. The SIM card 48 is inserted into a dedicated socket connected to the cellular system 46, and the encoded data is read by the baseband processor 49. Either of the cellular systems 46*a*, 46*b* can utilize either one of the SIM cards 48*a*, 48*b*, and different SIM cards 48 card be swapped depending on the availability of the cellular network(s) to which the aircraft operator subscribes. The first SIM card 48*a* may be used to connect to the aircraft operator-preferred cellular network, while the second SIM card 48*b* may be used to connect to a third-party contracted roaming operator network while the aircraft 10 is abroad. However, roaming capabilities may also be part of the aircraft operator-preferred cellular network subscription. The identity or network association of the SIM cards 48 is presented by way of example only and not of limitation.

Again, various embodiments of the present disclosure contemplate maximum interoperability with different cellular technologies and standards around the world. Setting the proper configuration options for the cellular systems 46 to access these networks may begin with retrieving the mobile country code (MCC) or the mobile network code (MNC) to identify location. There may be a lookup table that matches each possible MCC or MNC to selection of the appropriate cellular systems 46, operating mode (e.g., LTE, 3G, GSM) and operating frequency. Alternatively, GPS, city pair, or any other location based information can be used to control the selection of a particular one of the SIM cards 48. As a general matter, the faster networks are preferred, so the LTE modalities may be prioritized. Nevertheless, the multi-mode wireless data communications module 42 may scan through different available networks, and a step-wise scanning procedure by which different modes and frequencies are activated and deactivated may be implemented. To the extent roaming service is needed, the selection of a particular cellular network may be based upon an evaluation of a matrix of roaming charges in each geographic area.

Regardless of whether Wi-Fi or cellular network modalities are utilized to establish the data transfer link with the remote content server 38, all transmissions between the content loader 34 and the remote content server 38 are understood to take place over a virtual private network (VPN). To this end, as shown in the block diagram of FIG. 2, the content loader 34 may include a VPN client 54, and there may be a corresponding VPN server 58 at the remote content server 38. The software instructions implementing the functionality of the VPN client 54, along with other functions described in further detail below, may be executed by a controller 56. According to one embodiment, the controller 56 may be a general purpose microcontroller with CPUs incorporating Intel®, AMD, ARM based, or other architectures. There are contemplated minimum performance requirements, namely, data transfer rates of at least up to 500 Mbit/s in the physical layer (layer-1), though this is by way of example only and not of limitation.

Generally, the controller 56 establishes the data link to the remote content server 38 with the multi-mode wireless data communications module 42 to retrieve the multimedia content updates 36. The controller 56 also selects the communications mode (e.g., 4G LTE, 3G, Wi-Fi, etc.) based at least in part upon the aforementioned evaluation of the availability of a suitable access point in close proximity to the aircraft 10. The Wi-Fi communications mode may be preferred when available in order to reduce cellular network data charges. The anticipated size of the multimedia content updates 36 is approximately 200 gigabytes, which with an average download rate of 74.1 Mbps, the transfer can be completed within six hours. The download rates may be faster depending on the network conditions, and once completed, the content loader 34 may cease operation. Further improvements in data transfer speeds may be achieved with the combined use of both communications modes. Additionally, reliance on the cellular network may be reduced with the use of LIPA/SIPTO (Local IP Access and Selected Internet IP Traffic Offload).

The virtual private network encrypts all data traffic between the content loader 34 and the remote content server 38, and is understood to be Cisco IPSec-compliant. Different implementations of VPN may be utilized, with multiple VPN tunnels being supported. Different cryptographic functions to ensure data integrity such as SHA-1 (secure hash algorithm), MD5, and RSA may be provided, and multiple encryption modalities are contemplated, including DES, 3DES, and AES. Authentication may be performed over the RADIUS (Remote Authentication Dial In User Service) protocol to an existing remote RADIUS server 60. In addition to the VPN client 54, the content loader 34 includes a firewall 62 that implements network address translation as well as Media Access Control (MAC) address filtering, PPP (Point-to-Point Protocol) and PPoe routing.

An electrical power storage device or battery 64 supplies power to the various components of the content loader 34 under certain predetermined conditions. Under some conditions, the content loader 34 may be powered from the main electrical system of the aircraft 10, which is understood to supply a DC voltage of 28 V. The distribution of electrical power can be governed by a power regulator module 66 that is connected to the controller 56. The logic of when and under what conditions the power regulator module 66 directs the electrical power from either the electrical power storage device 64 or the main electrical system of the aircraft 10 may be implemented by the controller 56 in some embodiments, with the power regulator module 66 in effect being a switch that redirects the electrical power from one source to another. The components of the content loader 34 operate on various voltages from 5V DC to 28 V DC, so the power regulator module 66 is understood to be capable of outputting discrete voltage levels across this range. The quality of the electrical signal output from the power regulator module 66 to the various components of the content loader 34, regardless of source, may be improved with various conditioning and voltage regulator circuitry. Additionally, various protection circuits for power overload, short circuit, and so on may be incorporated into the power regulator module 66.

In one embodiment, the electrical power storage device 64 is a battery of one or more cells. The desirable power output and capacity characteristics may be achieved with a lithium-ion type battery, such as lithium cobalt, lithium iron phosphate, lithium nickel cobalt, lithium polymer or other lithium type battery. Due to higher chemical and thermal stability, lithium iron phosphate may be preferred for applications where safety is of paramount concern, such as in aviation, or lithium nickel cobalt aluminum oxide in which the aluminum provides greater chemical stability. Lithium-polymer batteries may be shaped to correspond to the space available in a line replaceable unit. Lithium batteries for aviation applications are available from Sanyo Electric Co. Ltd. of Sumoto City, Japan, in which Sanyo is a subsidiary of Panasonic Corporation. A possible alternative to lithium batteries is a fuel cell or cells. In either case, sufficient energy to power the various components of the content loader 34, particularly, the controller 56 and the multi-mode wireless data communications module 42, is preferable for at least three hours, and more preferably, a minimum of six hours. According to one embodiment, this requirement may be met with the electrical power storage device 64 having at least an 18 amp-hours capacity or an inclusive range from 80 to 100 watt-hours, and more preferably at least 138 watt-hours of capacity. The electrical power storage device 64 is preferably a rechargeable type, and in this regard, there may be a charging circuit 68 connected thereto and to the main electrical system of the aircraft 10 for convenient recharging thereof. The charging circuit 68 is contemplated to monitor the charging level, the temperature, and other conditions of the electrical power storage 64, and include indicators therefor. When charging is completed, or when the electrical power storage 64 is in a dangerous condition, the charging circuit 68 can discontinue charging. The electrical power storage 64 may be integrated into a single line replaceable unit of the content loader 34, or provided in a separate line replaceable unit independent of the remaining components of the content loader 34, both configurations of which will be described in further detail below.

The content loader 34 is powered by the electrical power storage device 64 when the aircraft 10 is powered down, that is, when there is no electrical power available from the main electrical system of the aircraft 10. Furthermore, the aforementioned connection and download procedure of the multimedia content updates 36 is contemplated to proceed during the time when the aircraft 10 is parked overnight during the hours of midnight to 6:00 am on a tarmac or in a hangar. Since in these circumstances the aircraft 10 is not powered on, the electrical power storage device 64 is utilized instead. Although a variety of inputs that designate this state of the aircraft 10 can be utilized, one embodiment utilizes either a Weight on Wheels (WoW) sensor or a door sensor. As will be recognized by those having ordinary skill in the art, the WoW sensor indicates that weight is on the landing gears, meaning that the aircraft 10 is on the ground and not airborne. Furthermore, the door sensor indicates that the fuselage door is unlocked, also indicating that the aircraft 10 is not airborne, and further, not in a condition for imminent flight. The corresponding inputs 69a, 69b thereof are received by the controller 56, and can be used to switch the power regulator module 66 to the electrical power storage 64.

Once the download of the multimedia content updates 36 completes by the following morning and the aircraft 10 is powered up again, the data storage device 40 is accessed by the in-flight entertainment system content server 30 to transfer the downloaded multimedia content updates 36 thereto. Still referring to the block diagram of FIG. 2, the content loader 34 includes a local area network module 70 that is connected to the local area network 32 that allows for communications with the in-flight entertainment system content server 30. The local area network module 70 is capable of gigabit Ethernet operation, though fallback to $10/100$ megabit operation is also contemplated. The powering up of the aircraft 10 initiates the recharging of the electrical power storage device 64.

From time to time, it may be necessary to update certain software and/or firmware of the content loader 34, and perform other maintenance tasks. Such tasks may be performed locally by connecting a conventional computer system to the content loader 34 via a USB (Universal Serial Bus) connection 71. Although USB is specified according to a preferred embodiment, any other suitable computer to computer interface may be substituted without departing from the present disclosure. Alternatively, it is possible to perform these tasks remotely over the SNMP protocol. The download of software or firmware updates may occur without personnel intervention, and can be included in the multimedia content updates 36 either before or after the initial payload data transmission. Any known techniques for automatic delivery of updates may be used.

Figure 3:
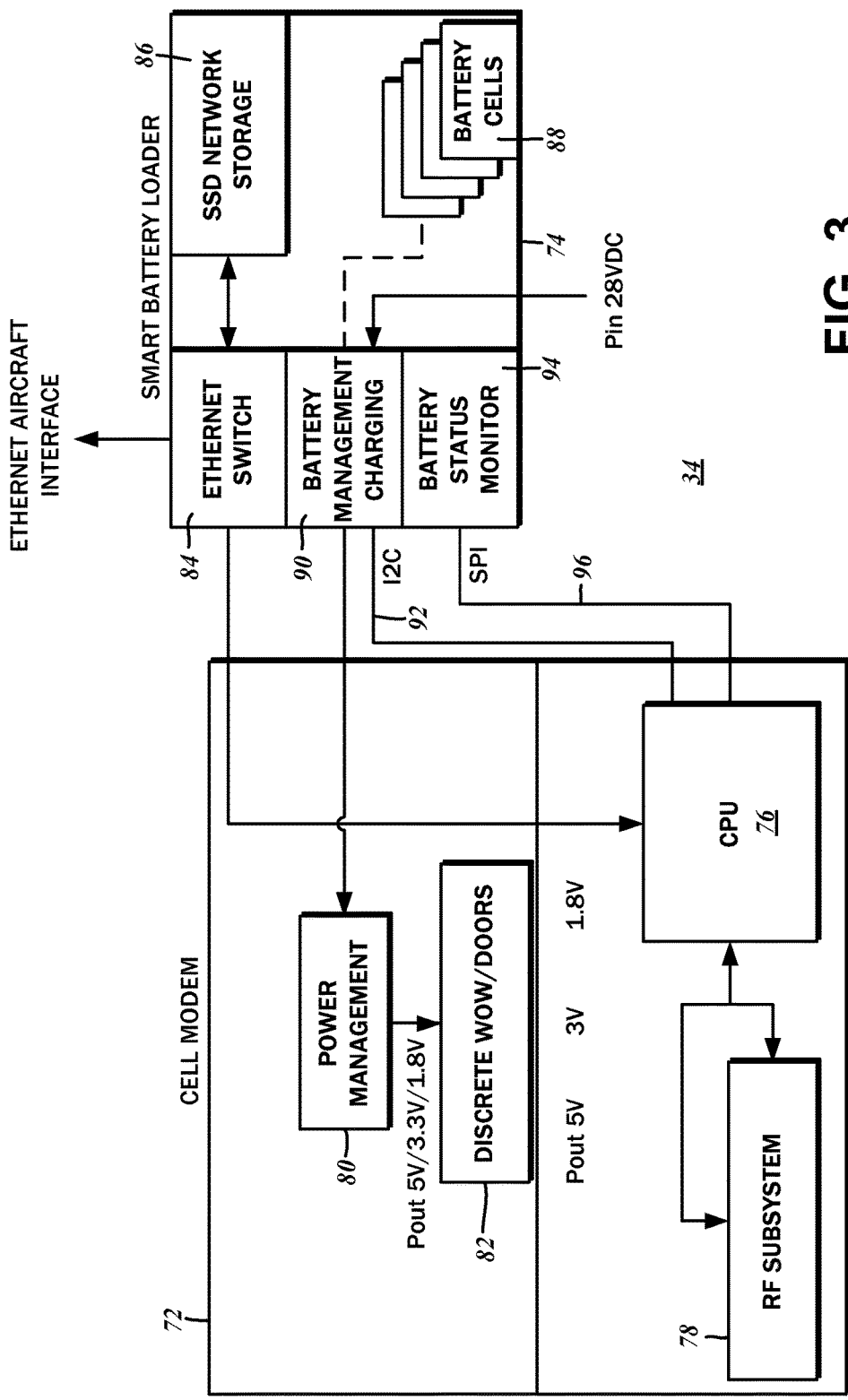
FIG. 3 is a block diagram of a hardware implementation of the wireless content loader in accordance with various embodiments of the present disclosure.

The content loader 34 has been described above in terms of the various functional modules thereof. Another embodiment of the content loader 34 depicted in FIG. 3, while incorporating the same general functional features as described above, may rely upon different components performing different subsets or combinations of such functions. In other words, the features and sub-components of the content loader 34 can be organized along different functional demarcations. In further detail, the content loader 34 may be logically and physically separated into a cell modem 72, and a smart battery loader 74. The cell modem 72 is generally comprised of a CPU 76, an RF subsystem 78, and a power management module 80. The CPU 76 substantially corresponds to the aforementioned controller 56, and executes various instructions that result in outputs being generated to control the peripheral components connected thereto, including the RF subsystem 78 in the cell modem 72, as well as other components in the smart battery loader 74. The RF subsystem 78 implements the various features of the multi-mode wireless data communications module 42, including the Wi-Fi communications mode and the cellular network communications mode thereof. As indicated above, the activation and use of the different communications modes is dependent on the state of the aircraft 10, in particular, whether the aircraft 10 is powered on or not as determined by the power management module 80, and/or whether the WoW and door sensors 82 indicate that the aircraft 10 is parked.

The smart battery loader 74 incorporates an Ethernet switch 84, which corresponds to the aforementioned local area network module 70. It is connected to the cell modem 72, and specifically to the CPU 76, such that the multimedia content updates 36 downloaded via the RF subsystem 78 is passed to Ethernet switch 84 and to an SSD network storage 86, also referred to above as the data storage device 40. According to various embodiments, and with additional reference back to the diagram of FIG. 1, the multimedia content updates 36 are downloaded by the cell modem 72 from the remote content server 38 and saved to the SSD network storage 86 when the aircraft 10 is powered off. Then, when the aircraft 10 is powered on, the multimedia content updates 36 stored on the SSD network storage 86 are transferred to the in-flight entertainment system content server 30. The SSD network storage 86 can also be used as an integrated storage for the in-flight entertainment system content server 30. Both the cell modem 72 and the components of the smart battery loader 74 are powered by battery cells 88, which correspond to the aforementioned electrical power storage 64.

Electrical power from the battery cells 88 is directed to the various components by a battery management and charging circuit 90 when it is so directed by the CPU 76 of the cell modem 72. As indicated above, this takes place when the aircraft 10 is stationary and powered down. When the aircraft 10 is powered up, however, the battery management and charging circuit 90 charges the battery cells 88 with the electrical power from the main electrical system of the aircraft 10, which is understood to be a 28V DC signal. The communication of these various commands between the battery management and charging circuit 90 and the CPU 76 may occur over an i2C serial bus connection 92. The status of the battery cells 88 may be monitored by a battery status monitoring module 94, which reports temperature and battery charging level information, among other data, to the cell modem 72, and specifically the CPU 76, which can act on that information to control the batter management and charging circuit 90, among others. The module 94 may communicate with the CPU 76 over a serial peripheral interface (SPI) connection 96.

Figure 4:
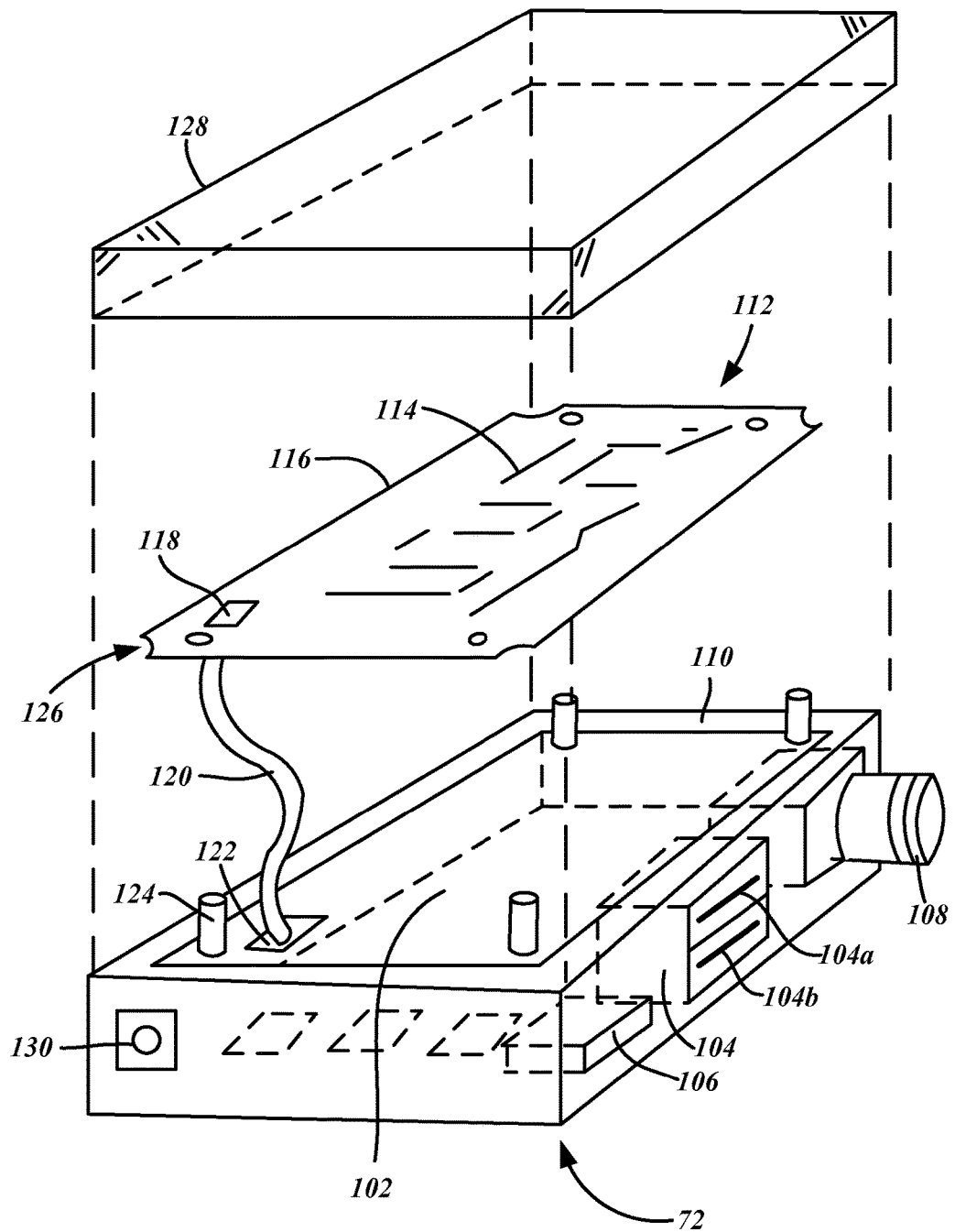
FIG. 4 is a perspective view of one embodiment of a line replaceable unit (LRU) incorporating the wireless content loader of the present disclosure.

The cell modem 72 can be physically embodied in one line replaceable unit (LRU) 98 as shown in FIG. 4, while the smart battery loader 74 may be embodied in another LRU. However, it is also possible to combine the two components into a single LRU 98, as shown in FIG. 4. As suggested by its name, the LRU 98 is understood to be interchangeable with other units that have the same dimensions and mount points on the aircraft 10. When one LRU 98 requires maintenance, another one may be immediately swapped in. Alternatively, the LRU 98 for the cell modem 72 may replace another device and supplant its functions entirely.

The LRU 98 is comprised of a base enclosure 100 that houses the various components of the cell modem 72 as discussed above. By way of example only and not of limitation, the base enclosure 100 may be an ARINC 836 casing, with a corresponding flange mount. In further detail, the base enclosure 100 may have a length dimension of 8.8", a width dimension of 6.5", and a height of 2". The base enclosure 100 has electromagnetic shielding, and a first printed circuit board 102 is disposed therein.

Mounted to the first printed circuit board 102 is a SIM card socket 104 which accepts the aforementioned SIM card 48 and locks it into place. In accordance with the dual SIM card embodiment, there may be a first socket 104a and a second socket 104b. Because the SIM card 48 is envisioned to be user-replaceable, the SIM card socket 104 is accessible from an exterior of the base enclosure 100. Additionally mounted to the first printed circuit board 102 is a USB port 106, which corresponds to the USB connection 71 of the content loader 34. The input of power from the aircraft 10 main electrical system as well as the input of power from the smart battery loader 74, along with the connection to the local area network 32, e.g., the Ethernet connection, may be combined into an aircraft interface connector 108 that is likewise accessible from the exterior of the base enclosure 100. The mechanical configuration of the aircraft interface connector 108 may vary, and the present disclosure is not intended to be limited to any particular one. In order to completely enclose the aforementioned components, there may additionally be an EMC cover 110 attached to the open top of the base enclosure 100.

As indicated above, various embodiments of the present disclosure contemplate both interior and exterior antennas. An interior antenna 112 is embodied as a series of conductive traces 114 on a second printed circuit board 116. These conductive traces 114 terminate at a PCB connector 118, to which a flexible connector cable 120 is attached. The other end of the flexible connector cable 120, in turn, is connected to a first antenna port 122 accessible from an exterior of the EMC cover 110. The second printed circuit board 116 is mounted on top of the base enclosure 100, and for alignment purposes, abutting from the base enclosure 100 are a series of support members 124 that interface with corresponding notches 126 defined on the second printed circuit board 116. There is a top cover 130 that attaches to the top of the base enclosure 100, and enclosing the components of the cell modem 72 including the second printed circuit board 116. On the side of the base enclosure 100 is an exterior antenna connector 128 to which the antenna lines to the exterior antennas are attached.

One of the communications mode of the content loader 34 could conform to IEEE 802.16 standards (frequently referred to as WiMAX) or other standard such as WiBro as is common in South Korea, or other proprietary standard. In an alternate embodiment, the content loader 34 includes a third communications mode 140 or more as indicated in FIG. 1. The first communications mode is preferably a Wireless LAN modality conforming to IEEE 802.11 standards, the second mode preferably conforms to WiMAX or WiBro or other standard, while the third mode is a cellular network modality. In addition, the content loader 34 may include an ad-hoc networking modality.

The particulars shown herein are by way of example and for purposes of illustrative discussion of the various embodiments of the content loader only and are presented in the cause of providing of what is believed to be the most useful and readily understood description of the principles and conceptual aspects thereof. In this regard, no attempt is made to show more details than are necessary for a fundamental understanding of the disclosure, the description taken with the drawings making apparent to those skilled in the art how the several forms of the presently disclosed illumination module may be embodied in practice.

What is claimed is:

1. A content loader for downloading multimedia content having a predetermined size from a remote content server over one or a combination of a first wireless network and a second wireless network to a content server of an entertainment system of an aircraft having an electrical system, the content loader comprising:
   a multi-mode wireless data communications module executed by one or more hardware processors and having at least a first communications mode corresponding to the first wireless network and a second communications mode corresponding to the second wireless network;
   a controller that establishes a data link to the remote content server with the multi-mode wireless data communications module, the controller activating either one or both of the first communications mode and the second communications mode based at least in part upon an evaluation of availability of the first wireless network being within range;
   a data storage device that stores the retrieved multimedia content and has a capacity of 256 GB or more accommodating the predetermined size of the retrieved multimedia content; and
   an electrical power storage device selectively connectible to the multi-mode wireless data communications module, the controller, and the data storage device, the electrical power storage device being selectively connected in response to the electrical system of the aircraft being powered down, the electrical power storage device being rechargeable;

wherein the controller downloads the multimedia content while the electrical system of the aircraft is powered down, the predetermined size of the multimedia content being based upon a time period between scheduled operations of the aircraft during which the multimedia content is to be transmitted from the remote content server, the electrical power storage device having a capacity of 80 watt-hours or more to power the multi-mode wireless communications module, the controller, and the data storage device specifically for the time period during which the multimedia content is to be transmitted from the remote content server, and wherein the controller further copies the multimedia content stored on the data storage device to the content server of the entertainment system following the electrical system of the aircraft being powered up upon resuming the operation of the aircraft.

2. The content loader of claim 1, wherein:
the first communications mode is a cellular network; and
the second communications mode is a wireless local area network.

3. The content loader of claim 2, wherein:
the data link is selectively carried over the first wireless network of a first provider and the first wireless network of a second provider as defined by subscriber identities stored on a respective one of a first subscriber identification module and a second subscriber identification module both connected to the multi-mode wireless data communications module.

4. The content loader of claim 3, wherein the selection of the first wireless network of the first provider and the first wireless network of the second provider is based upon a reported geographic location of the aircraft.

5. The content loader of claim 2, wherein the multi-mode wireless data communications module includes a multiple-input, multiple output (MIMO) transceiver with a plurality of input lines and a plurality of output lines, combinations of one or more of the plurality of input lines and one or more of the plurality of output lines defining MIMO streams.

6. The content loader of claim 5, further comprising:
a plurality of internal antenna elements;
a plurality of external antenna elements;
a first one of the MIMO streams connected to one or more of the plurality of internal antenna elements;
a second one of the MIMO streams connected to one or more of the plurality of external antenna elements; and
a plurality of antenna connection lines each corresponding and connected to at least one of the plurality of input lines and the plurality of output lines.

7. The content loader of claim 1, wherein the data link includes a virtual private network (VPN) tunnel from the controller to the remote content server.

8. The content loader of claim 1, wherein the electrical power storage device comprises a lithium-ion battery.

9. The content loader of claim 8, further comprising:
a charging circuit connected to the electrical power storage device and connectible to an electrical power source of the aircraft.

10. The content loader of claim 9, wherein the electrical power storage device is recharged with the charging circuit following the electrical system of the aircraft being powered up.

11. The content loader of claim 1, wherein the electrical power storage device comprises a lithium iron phosphate battery.

12. The content loader of claim 1, wherein the electrical power storage device comprises a fuel cell.

13. The content loader of claim 1, wherein the multi-mode wireless data communications module, the controller, the data storage device, and the electrical power storage are integrated into a single line-replaceable unit mounted to the aircraft.

14. The content loader of claim 1, wherein:
the multi-mode wireless data communications module, the controller, and the data storage device are integrated into a first line replaceable unit mounted to the aircraft; and
the electrical power storage is integrated into a second line replaceable unit mounted to the aircraft.

15. The content loader of claim 1, wherein the data storage device is a solid state drive.

16. A wireless multimedia content loader for transferring multimedia content retrieved over a data transfer link from a remote content source server to an entertainment system content server of an aircraft having a main aircraft electrical system, the wireless multimedia content loader comprising:
a central processing unit;
a data storage device connected to the central processing unit and having a capacity of 256 GB or more;
one or more aircraft state sensor inputs lines connected to the central processing unit;
a network terminal controller connected to the central processing unit and in data transfer communication with the entertainment system content server;
a wireless communications subsystem that establishes the data transfer link and is connected to the central processing unit, the multimedia content being downloadable from the remote content source server over the established data transfer link and having a predetermined size based upon a time period between scheduled operations of the aircraft during which the multimedia content is to be downloaded from the remote content server; and
a power management module executed by one or more hardware processors that regulates electrical power supplied to the wireless multimedia content loader, the power management module including a power source switch having a first input connected to an external rechargeable source and a second input connected to the main aircraft electrical system, the power source switch being selectively activated by the central processing unit in response to a first predetermined signal to the central processing unit from the one or more aircraft state sensor input lines, the external rechargeable source having a capacity of 80 watt-hours or more to power the central processing unit, the data storage device, and the wireless communications subsystem specifically for the time period during which the multimedia content is to be downloaded from the remote content server.

17. The wireless multimedia content loader of claim 16, wherein the central processing unit commands the power management module to source electrical power from the main aircraft electrical system in response to a second predetermined signal from the one or more aircraft state sensor input lines.

18. The wireless multimedia content loader of claim 17, wherein the central processing unit directs the copying of the multimedia content stored on the data stored device while the power management module is directing electrical power from the main aircraft electrical system.

19. The wireless multimedia content loader of claim 16, wherein the central processing unit directs the downloading of the multimedia content from the remote content source server while the power management module is directing electrical power from the external rechargeable power source.

20. The wireless multimedia content loader of claim 16, wherein the wireless communications subsystem has at least a wireless local area network mode and a cellular network mode.

* * * * *